United States Patent [19]
Yamamuro et al.

[11] Patent Number: 5,239,658
[45] Date of Patent: Aug. 24, 1993

[54] SWITCHABLE PARALLEL BUS TERMINATOR HAVING STABLE TERMINATOR VOLTAGE WITH RESPECT TO AMBIENT TEMPERATURE CHANGE

[75] Inventors: Mikio Yamamuro; Hiroshi Watanabe, both of Kawasaki, Japan

[73] Assignee: Kabushiki Kaisha Toshiba, Kawasaki, Japan

[21] Appl. No.: 588,103

[22] Filed: Sep. 25, 1990

[30] Foreign Application Priority Data

Sep. 29, 1989 [JP] Japan ................... 1-252165

[51] Int. Cl.⁵ ............ G06F 3/02; G06F 13/00
[52] U.S. Cl. ............... 395/800; 340/825.52; 340/825; 370/85.1; 364/927.93; 364/929.1; 364/DIG. 2; 364/240.7
[58] Field of Search ............. 395/800, 200; 340/825.52, 825; 382/47, 16, 825; 307/443; 370/85.1

[56] References Cited

U.S. PATENT DOCUMENTS

| | | | |
|---|---|---|---|
| 4,514,799 | 4/1985 | Spencer et al. | 395/800 |
| 4,667,248 | 5/1987 | Kanno | 358/452 |
| 4,799,147 | 1/1989 | Heslin | 395/800 |
| 4,920,339 | 4/1990 | Friend et al. | 340/825.52 |
| 5,027,421 | 6/1991 | Kanno | 382/47 |
| 5,029,284 | 7/1991 | Feldbaumer et al. | 307/443 |
| 5,034,878 | 7/1991 | Haapala et al. | 395/200 |
| 5,038,383 | 8/1991 | Usumoto et al. | 382/16 |

Primary Examiner—Thomas C. Lee
Assistant Examiner—Meng-Ai T. An
Attorney, Agent, or Firm—Finnegan, Henderson, Farabow, Garrett & Dunner

[57] ABSTRACT

A system in which a plurality of devices are connected through an interface bus for transmitting data, which includes a set of termination resistors respectively connected to a plurality of signal lines of the interface bus. The termination resistors are simultaneously switched to valid/invalid states in accordance with ON/OFF control of a 1-bit switch.

7 Claims, 2 Drawing Sheets

SWITCHABLE PARALLEL BUS TERMINATOR HAVING STABLE TERMINATOR VOLTAGE WITH RESPECT TO AMBIENT TEMPERATURE CHANGE

BACKGROUND OF THE INVENTION

Field of the Invention

The present invention relates to an improvement in bus interface equipment used in a data processing apparatus in an image data filing system for processing, e.g., image data.

Description of the Related Art

In a recently available image data filing system, image data as of a large number of documents are optically read by two-dimensional scanning, the read image data are stored in an optical disk, arbitrary image data is retrieved and read out, and the read image data is output to an output device such as a CRT display or a printer through an interface to allow visual confirmation of the image data.

In this system, a system controller is connected to a CRT display interface, a hard disk drive interface, a floppy disk drive interface, an optical disk drive interface, an image scanner interface, a printer interface, a communication controller interface, and a keyboard interface through a common interface bus (e.g., SCSI bus).

In the above system, in order to prevent the interface bus from reflection of signal propagation, termination resistors must be arranged in devices located at both termination portions of the interface bus line.

In this case, as a termination resistor module, a DIP type resistor module or block resistor type resistor module must be mounted in a socket (e.g., IC socket) on a printed circuit board of the corresponding device, thereby setting termination resistances.

As described above, termination resistor modules must be detachably arranged such that each termination resistor module is mounted in a device located at each termination of the interface bus, and such modules are not mounted in other devices. In order to attach this termination resistor module to each termination device or detach it from a non-termination device, the devices must be disassembled. In addition, there is a fear of erroneously arranging a termination resistor module, i.e., erroneously inserting the termination resistor module such that the power source side of the module is erroneously connected as the ground side, thereby degrading reliability of the system.

It is, therefore, difficult for a user to set a valid state (connected state) of termination resistors or an invalid state (disconnected state) thereof. As described above, the termination resistor module could be erroneously inserted, and system reliability is thus degraded.

SUMMARY OF THE INVENTION

It is an object of the present invention to provide a filing system with a bus interface, which eliminates all conventional drawbacks which do not allow a user to perform easy setup of a valid/invalid state of termination resistors, involve a possibility of erroneous insertion of the termination resistor module, and degrade system reliability, that is, a filing system which allows the user to easily set the valid/invalid state of the termination resistors, eliminates erroneous insertion of the termination resistor module, and improves system reliability.

In a filing system according to the present invention, wherein a plurality of devices are connected to an interface bus (e.g., SCSI bus) comprising a plurality of signal lines, each device includes: termination resistors respectively corresponding to the signal lines of the interface bus, a switching circuit for simultaneously switching valid/invalid states of the termination resistors, and a 1-bit switch for operating the switching circuit.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles f the invention.

DESCRIPTION OF THE PREFERRED EMBODIMENTS

An embodiment of the present invention will be described in detail with reference to the accompanying drawings.

Figure 2:
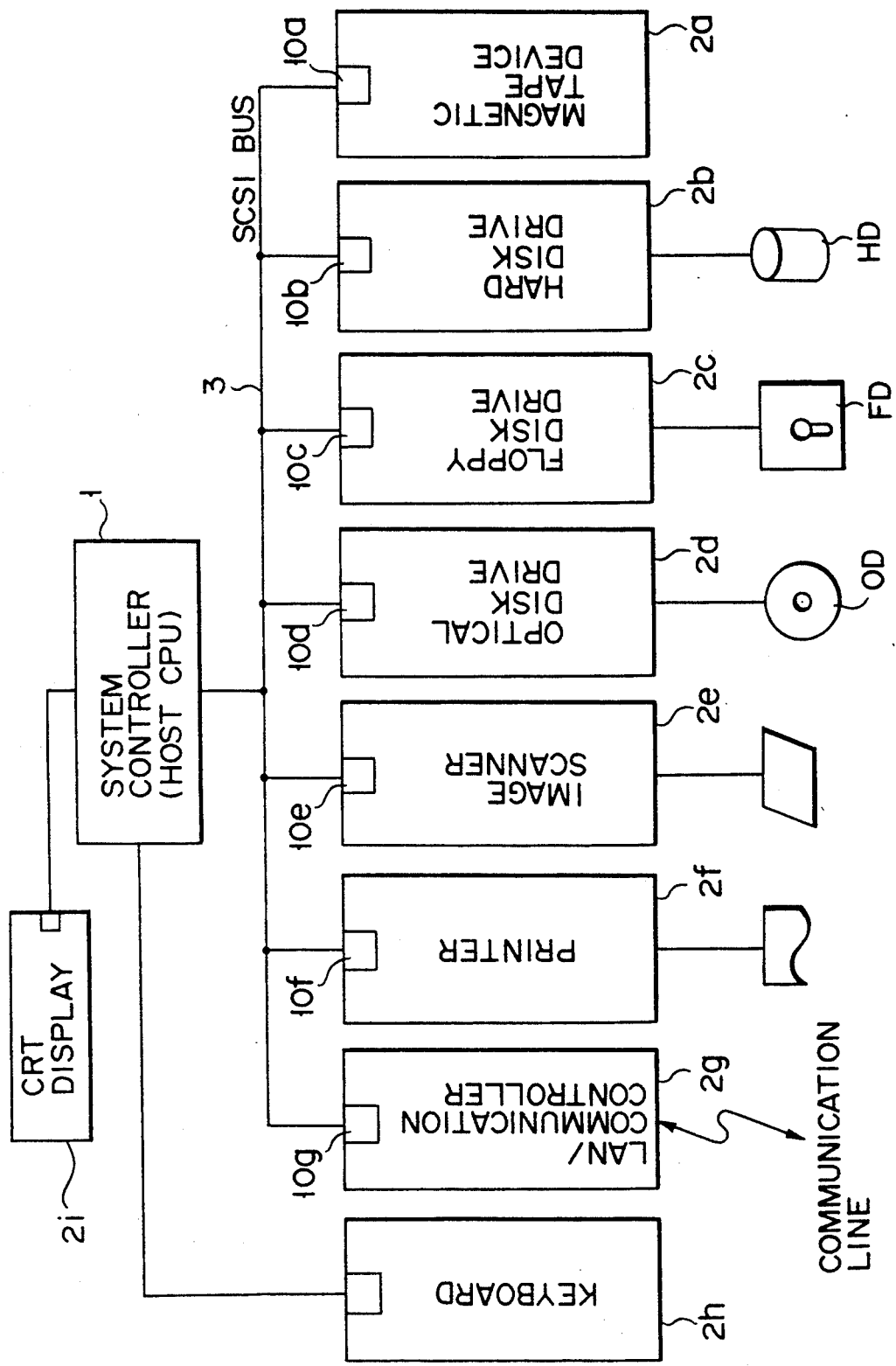
FIG. 2 is a schematic block diagram showing an arrangement of an electronic filing system.

FIG. 2 shows an image data filing system as a typical filing system according to the present invention. This image data filing system includes system controller 1 connected to magnetic tape device 2a, hard disk drive 2b, floppy disk drive 2c, optical disk drive 2d, image scanner 2e, printer 2f, and LAN/communication controller 2g, via interface bus 3 complying with the SCSI standards and consisting of a plurality of signal lines (18 signal lines). Also connected to controller 1 are keyboard 2h and CRT display 2i.

Figure 1:
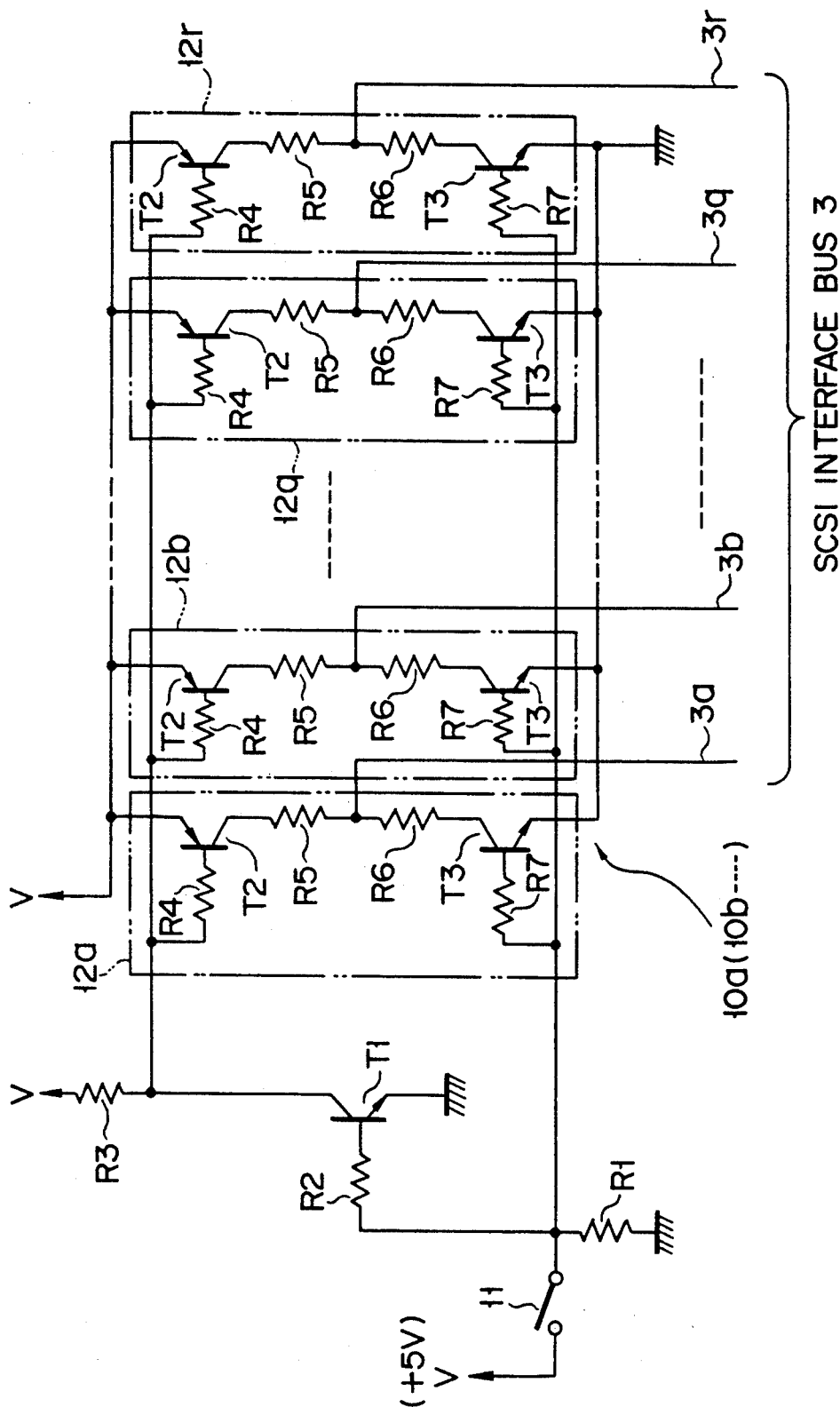
FIG. 1 is a circuit diagram showing an arrangement of a termination resistor module.

Termination resistor modules 10a to 10g are arranged in devices 2a to 2g in advance, respectively. Each of termination resistor modules 10a to 10g is connected to SCSI bus 3 and comprises 1-bit switch 11 for setting a valid/invalid state of the termination resistors, as shown in FIG. 1. An inverter consisting of resistors R1 to R3 and npn transistor T1 is ON/OFF-controlled by switch 11. When transistor T1 is turned on, termination resistor sections 12a to 12r set (connect) termination resistors R5 and R6 to 18 signal lines 3a to 3r of the interface bus.

Each of termination resistor sections 12a to 12r comprises pnp transistor T2, npn transistor T3, termination resistors R5 and R6, and base resistors R4 and R7.

When switch 11 is OFF, transistor T1 is OFF, and transistors T2 and T3 in each of termination resistor sections 12a to 12r are OFF. No voltage is applied across termination resistors R5 and R6. Therefore, termination resistors R5 and R6 are kept disconnected from corresponding signal lines 3a to 3r of bus 3.

When switch 11 is ON, transistor T1 is ON, and transistors T2 and T3 in each of termination resistor sections 12a to 12r are ON accordingly. A voltage is applied across termination resistors R5 and R6. For this reason, termination resistors R5 and R6 are connected to corresponding signal lines 3a, . . . of bus 3.

Assume that CRT magnetic tape device 2a and LAN controller 2g are connected to both terminations of signal lines 3a to 3r of bus 3. In this case, switches 11 in termination resistor modules 10a and 10g in device 2a and controller 2g are ON, while switches 11 in termination resistor modules 10b, . . . in other devices are OFF. Therefore, termination resistors R5 and R6 are connected to signal lines 3a to 3r for device 2a and controller 2g.

Note that transistors T1 to T3 can be FETs, respectively.

As described above, according to the present invention, there is provided a data processing system wherein the user can easily set a valid/invalid state of termination resistors, erroneous insertion of the termination resistor module can be prevented, and system reliability can be improved.

System controller 1 in FIG. 2 can be constituted as a CPU and its peripheral circuits disclosed in Kanno, U.S. Pat. No. 4,667,248 Patented on May 19, 1987, "Document Image Editing Device".

All the disclosed contents of the above U.S.P. are incorporated in the present invention.

FIG. 1 exemplifies an unbalanced bus. However, if one more set of termination resistor sections 12a to 12r shown in FIG. 1 is added, the present invention is applicable to a balanced bus.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A switchable parallel bus terminator device comprising:
    means for designating whether termination resistors are to be electrically connected to signal lines of a parallel bus;
    means, coupled to said designating means, for generating a first level at a first node and a second level at a second node when said designating means designates that the termination resistors are to be electrically connected to the signal lines, and generating the second level at the first node and the first level at the second node when said designating means designates that the termination resistors are not to be electrically connected to the signal lines; and
    terminator units having output nodes connected to the signal lines of said parallel bus, each of said terminator units including:
        a first conductivity type transistor having a base that is connected to the first node of said generating means, an emitter that is connected to a circuit providing the second level, and a collector;
        a second conductivity type transistor having a base that is connected to the second node of said generating means, an emitter that is connected to a circuit providing the first level, and a collector;
        a first resistor that is connected between the collector of said first conductivity type transistor and the output node of said terminator unit; and
        a second resistor that is connected between the collector of said second conductivity type transistor and the output node of said terminator unit.

2. A device according to claim 1, wherein said bus comprises a bus complying with Small Computer System Interface (SCSI) standards X3.131-1986 of the American National Standard Institute (ANSI) or a higher-level version bus.

3. A device according to claim 1, wherein said bus comprises a bus that is compatible with a bus complying with Small Computer System Interface (SCSI) standards X3.131-1986 of the American National Standard Institute (ANSI).

4. A device according to claim 1, wherein said designating means includes means for simultaneously connecting the termination resistors of al of said terminator units to the signal lines.

5. A device according to claim 1, wherein said designating means includes means for inverting the first level of the first node to produce the second level at the second node and inverting the second level of the first node to produce the first level at the second node.

6. A device according to claim 1, wherein said designating means includes means for simultaneously turning-on the first and second conductivity type transistors of all of said terminator units to simultaneously connect the termination resistors of all of said terminator units to the signal lines.

7. A device according to claim 1, wherein said designating means includes means for simultaneously turning-off the first and second conductivity type transistors of all of said terminator units to simultaneously disconnect the termination resistors of all of said terminator units from the signal lines.

* * * * *